United States Patent
Wang

(10) Patent No.: US 12,523,751 B2
(45) Date of Patent: Jan. 13, 2026

(54) SYSTEM AND METHOD FOR PERFORMING LIDAR SELF-CALIBRATION AND APPLICATION OF SAME

(71) Applicant: Guangzhou Xiaopeng Autopilot Technology Co., Ltd., Guangdong (CN)

(72) Inventor: Chao Wang, Milpitas, CA (US)

(73) Assignee: GUANGZHOU XIAOPENG AUTOPILOT TECHNOLOGY CO., LTD., Guangdong (CN)

( * ) Notice: Subject to any disclaimer, the term of this patent is extended or adjusted under 35 U.S.C. 154(b) by 903 days.

(21) Appl. No.: 17/825,066

(22) Filed: May 26, 2022

(65) Prior Publication Data

US 2023/0384434 A1    Nov. 30, 2023

(51) Int. Cl.
*G01S 7/497* (2006.01)
*G01S 17/931* (2020.01)

(52) U.S. Cl.
CPC ............ *G01S 7/497* (2013.01); *G01S 17/931* (2020.01)

(58) Field of Classification Search
None
See application file for complete search history.

(56) References Cited

U.S. PATENT DOCUMENTS 11,623,494 B1 * 4/2023 Arnicar ................. G01S 17/931
                                                         701/37
12,174,301 B2 * 12/2024 Hu ........................ G01S 7/4972

* cited by examiner

*Primary Examiner* — Hovhannes Baghdasaryan
(74) *Attorney, Agent, or Firm* — troutman pepper locke; Tim Tingkang Xia, Esq.

(57) ABSTRACT

A system and a method for performing perorming lidar self-calibration are provided. The system includes a lidar sensor disposed on a vehicle. In operation, the lidar sensor obtains a lidar reference signal based on a plurality of reference objects corresponding to the vehicle, and determines a tilt angle of the lidar sensor based on the lidar reference signal. The tilt angle is then isolated into multiple isolated angles, such as a pitch, a row and a yaw. For each corresponding isolated angle, the lidar sensor determines, based on a corresponding calibration criteria, a corresponding offset between the lidar sensor and the vehicle for the corresponding isolated angle, and performs a compensation to the corresponding isolated angle based on the corresponding offset. Thus, the lidar sensor may detect and compensate any angular offset to the point cloud, thus achieving lidar self-calibration.

20 Claims, 12 Drawing Sheets

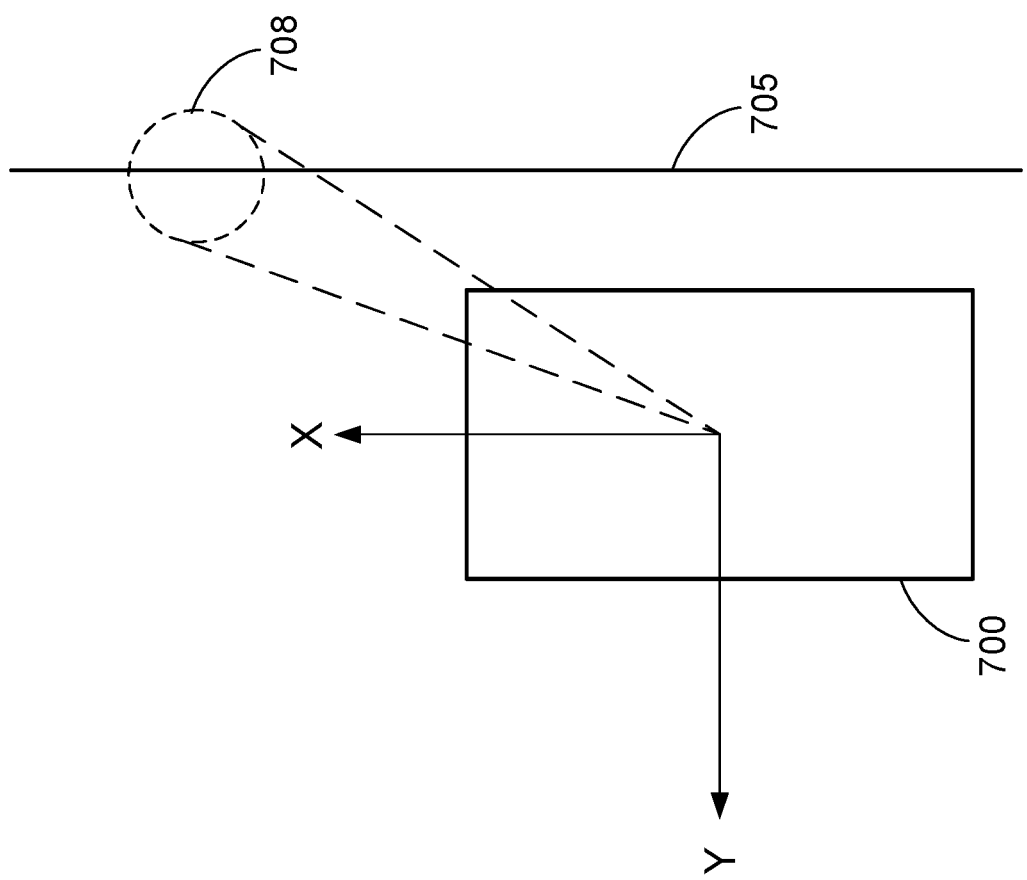

SYSTEM AND METHOD FOR PERFORMING LIDAR SELF-CALIBRATION AND APPLICATION OF SAME

FIELD OF THE INVENTION

The present invention relates generally to lidar technology, and more particularly to a system and a method for performing lidar self-calibration, and applications of the same.

BACKGROUND OF THE INVENTION

The background description provided herein is for the purpose of generally presenting the context of the present invention. The subject matter discussed in the background of the invention section should not be assumed to be prior art merely as a result of its mention in the background of the invention section. Similarly, a problem mentioned in the background of the invention section or associated with the subject matter of the background of the invention section should not be assumed to have been previously recognized in the prior art. The subject matter in the background of the invention section merely represents different approaches, which in and of themselves may also be inventions.

Lidar (which is an acronym that stands for "LIght Detection And Ranging") is a remote sensing method that uses light in the form of a pulsed laser to measure ranges or variable distances. Specifically, in the lidar technology, a laser is used for targeting an object, and the ranges or variable distances can be obtained by measuring the time for the reflected light to return to the receiver. Lidar is commonly used to in various applications, such as making high-resolution maps, or controlling and navigating for autonomous cars. In order to obtain accurate and precise measurement, a lidar requires constant calibration. However, there are some circumstances that the lidar may be off its calibrated position, thus introducing an unwanted angular offset to the point cloud.

Therefore, a heretofore unaddressed need exists in the art to address the aforementioned deficiencies and inadequacies.

SUMMARY OF THE INVENTION

The present invention relates to a system and a method for performing lidar self-calibration, and applications of the same. Specifically, the system and method may be applied on the lidar to detect and compensate any angular offset to the point cloud, in which the lidar itself is utilized as the position sensor.

In one aspect of the invention, a system for performing lidar self-calibration is provided. In certain embodiments, the system includes a lidar sensor disposed on a vehicle and having a processor and a storage device storing computer executable instructions. The computer executable instructions, when executed on the processor, cause the processor to: obtain a lidar reference signal based on a plurality of reference objects corresponding to the vehicle; determine a tilt angle of the lidar sensor based on the lidar reference signal; isolate the tilt angle into a plurality of isolated angles, wherein the isolated angles include a pitch, a row and a yaw; and for each corresponding isolated angle of the isolated angles, determine, based on a corresponding calibration criteria, a corresponding offset between the lidar sensor and the vehicle for the corresponding isolated angle; and perform a compensation to the corresponding isolated angle based on the corresponding offset.

In another aspect of the present invention, a method for performing lidar self-calibration to a lidar sensor disposed on a vehicle includes: obtaining, by the lidar sensor, a lidar reference signal based on a plurality of reference objects corresponding to the vehicle; determining a tilt angle of the lidar sensor based on the lidar reference signal; isolating the tilt angle into a plurality of isolated angles, wherein the isolated angles include a pitch, a row and a yaw; and for each corresponding isolated angle of the isolated angles, determining, based a corresponding calibration criteria, a corresponding offset between the lidar sensor and the vehicle for the corresponding isolated angle; and performing a compensation to the corresponding isolated angle based on the corresponding offset.

In one embodiment, the computer executable instructions, when executed on the processor, further cause the processor to, for each corresponding isolated angle, obtain a plurality of consecutive corresponding offsets between the lidar sensor and the vehicle for the corresponding isolated angle; and determine whether a corresponding compensated result is valid based on values of the consecutive corresponding offsets, wherein the compensation to the corresponding isolated angle is performed only in response to determining the corresponding compensated result to be valid.

In one embodiment, the reference objects include a road, and the computer executable instructions, when executed on the processor, cause the processor to obtain the lidar reference signal by obtaining a plurality of slopes of the road along a roll axis periodically, wherein the slopes are configured for calculation of the pitch of the tilt angle, and each corresponding slope of the slopes is obtained by: obtaining a lidar frame from a point cloud generated by the lidar sensor; extracting, from the lidar frame, information of the road within a range from the vehicle; calculating, based on the information of the road, the corresponding slope of the road along the roll axis. In one embodiment, the range is between 3 m and 20 m.

In one embodiment, the slopes include three consecutive slopes of the road along the roll axis, the corresponding calibration criteria for the pitch is a value of each of the three consecutive slopes, and the computer executable instructions, when executed on the processor, cause the processor to determine the corresponding offset for the pitch by: determining whether each of the three consecutive slopes are equal; in response to determining each of the three consecutive slopes are not equal, determining the road to be not level and the pitch of the tilt angle is not calculable based on the three consecutive slopes; and in response to determining each of the three consecutive slopes are equal, determining the road to be level and the corresponding offset for the pitch to be the value of each of the slopes.

In one embodiment, the reference objects include a road and a straight structure, and the computer executable instructions, when executed on the processor, cause the processor to obtain the lidar reference signal by obtaining a slope of the road along a pitch axis, wherein the slope is configured for calculation of the roll of the tilt angle, and the slope is obtained by: obtaining a lidar frame from a point cloud generated by the lidar sensor; extracting, from the lidar frame, information of the road and the straight structure within a range from the vehicle; and calculating, based on the information of the road and the straight structure, the slope of the road along the pitch axis. In one embodiment, the straight structure is a building wall or a street light pillar along the road, and the range is about 5 m.

In one embodiment, the corresponding calibration criteria for the roll is a value of the slope; the roll of the tilt angle does not exist when the value of the slope is zero; and the roll of the tilt angle exists when the value of the slope is not zero, and the corresponding offset between the lidar sensor and the vehicle for the roll is the value of the slope.

In one embodiment, the reference objects include a parallel structure along a road, and the computer executable instructions, when executed on the processor, cause the processor to obtain the lidar reference signal by obtaining a plurality of deviations between the parallel structure and a roll axis and a plurality of distances between the parallel structure and a pitch axis periodically, wherein the deviations and the distances are configured for calculation of the yaw of the tilt angle, and each of the deviations and the distances is obtained by: obtaining a lidar frame from a point cloud generated by the lidar sensor; extracting, from the lidar frame, information of the road and the parallel structure within a range from the vehicle; and calculating, based on the information of the road and the straight structure, a corresponding deviation between the parallel structure and the roll axis and a corresponding distance between the parallel structure and the pitch axis. In one embodiment, the parallel structure is a road line, a curb along the road, or a road fence along the road, and the range is between 3 m and 20 m.

In one embodiment, the deviations include two consecutive deviations, the distances include two consecutive distances, the corresponding calibration criteria for the yaw is a value of each of the two consecutive deviations and a value of each of the two consecutive distances, and the computer executable instructions, when executed on the processor, cause the processor to determine the corresponding offset for the yaw by: determining whether each of the two consecutive deviations are equal; in response to determining each of the two consecutive deviations are not equal, determining the yaw of the tilt angle is not calculable based on the two consecutive deviations; in response to determining each of the two consecutive deviations are equal, determining whether a value of each of the two consecutive deviations is zero and whether each of the two consecutive distances are equal; in response to determining value of each of the two consecutive deviations to be zero and each of the two consecutive deviations to be equal, determining the corresponding offset for the yaw to be zero; in response to determining the value of each of the two consecutive deviations to be zero and each of the two consecutive deviations are not equal, determining the vehicle is not moving along the roll axis, and the yaw of the tilt angle is not calculable based on the two consecutive deviations and the two consecutive distances; and in response to determining the value of each of the two consecutive deviations to be not zero and each of the two consecutive deviations are not equal, determining the corresponding offset for the yaw to be the value of each of the two consecutive deviations.

Yet another aspect of the present invention relates to non-transitory tangible computer-readable medium storing computer executable instructions which, when executed by one or more processors, cause the method as discussed to be performed.

Yet a further aspect of the invention relates to a vehicle or an autonomous system having the system as described above.

These and other aspects of the present invention will become apparent from the following description of the preferred embodiments, taken in conjunction with the following drawings, although variations and modifications therein may be affected without departing from the spirit and scope of the novel concepts of the disclosure.

BRIEF DESCRIPTION OF THE DRAWINGS

The accompanying drawings illustrate one or more embodiments of the invention and, together with the written description, serve to explain the principles of the invention. The same reference numbers may be used throughout the drawings to refer to the same or like elements in the embodiments.

FIG. 7A shows schematically detection for the yaw of the tilt angle using a parallel structure as the reference object according to certain embodiments of the invention.

DETAILED DESCRIPTION OF THE INVENTION

Figure 1:
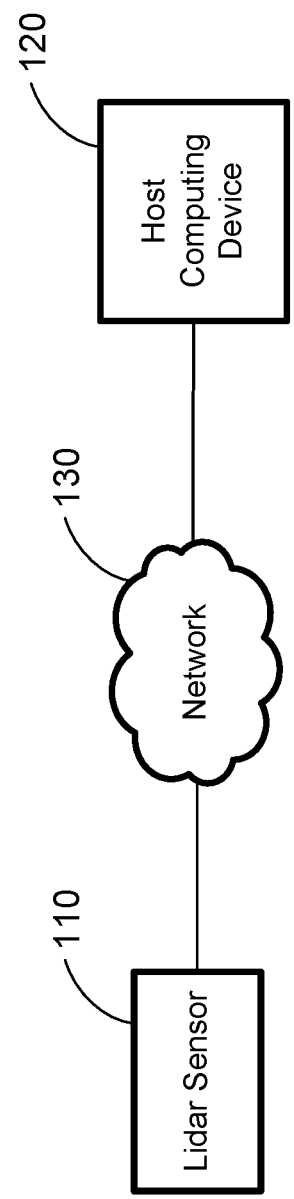
FIG. 1 shows schematically an overall architecture of a lidar system according to one embodiment of the invention.

The invention will now be described more fully hereinafter with reference to the accompanying drawings, in which exemplary embodiments of the invention are shown. This invention may, however, be embodied in many different forms and should not be construed as limited to the embodiments set forth herein. Rather, these embodiments are provided so that this invention will be thorough and complete, and will fully convey the scope of the invention to those skilled in the art. Like reference numerals refer to like elements throughout.

The terms used in this specification generally have their ordinary meanings in the art, within the context of the invention, and in the specific context where each term is used. Certain terms that are used to describe the invention are discussed below, or elsewhere in the specification, to provide additional guidance to the practitioner regarding the description of the invention. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and in no way limits the scope and meaning of the invention or of any exemplified term. Likewise, the invention is not limited to various embodiments given in this specification.

It will be understood that, as used in the description herein and throughout the claims that follow, the meaning of "a", "an", and "the" includes plural reference unless the context clearly dictates otherwise. Also, it will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the invention.

Furthermore, relative terms, such as "lower" or "bottom" and "upper" or "top," may be used herein to describe one element's relationship to another element as illustrated in the figures. It will be understood that relative terms are intended to encompass different orientations of the device in addition to the orientation depicted in the figures. For example, if the device in one of the figures is turned over, elements described as being on the "lower" side of other elements would then be oriented on "upper" sides of the other elements. The exemplary term "lower", can therefore, encompasses both an orientation of "lower" and "upper," depending of the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

It will be further understood that the terms "comprises" and/or "comprising," or "includes" and/or "including" or "has" and/or "having", or "carry" and/or "carrying," or "contain" and/or "containing," or "involve" and/or "involving, and the like are to be open-ended, i.e., to mean including but not limited to. When used in this invention, they specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present invention, and will not be interpreted in an idealized or overly formal sense unless expressly so defined herein.

As used herein, the phrase at least one of A, B, and C should be construed to mean a logical (A or B or C), using a non-exclusive logical OR. As used herein, the term "and/or" includes any and all combinations of one or more of the associated listed items.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip.

The term module may include memory (shared, dedicated, or group) that stores code executed by the processor.

The terms chip or computer chip, as used herein, generally refers to a hardware electronic component, and may refer to or include a small electronic circuit unit, also known as an integrated circuit (IC), or a combination of electronic circuits or ICs.

As used herein, the term microcontroller unit or its acronym MCU generally refers to a small computer on a single IC chip that can execute programs for controlling other devices or machines. A microcontroller unit contains one or more CPUs (processor cores) along with memory and programmable input/output (I/O) peripherals, and is usually designed for embedded applications.

The term interface, as used herein, generally refers to a communication tool or means at a point of interaction between components for performing wired or wireless data communication between the components. Generally, an interface may be applicable at the level of both hardware and software, and may be uni-directional or bi-directional interface. Examples of physical hardware interface may include electrical connectors, buses, ports, cables, terminals, and other I/O devices or components. The components in communication with the interface may be, for example, multiple components or peripheral devices of a computer system.

The term code, as used herein, may include software, firmware, and/or microcode, and may refer to programs, routines, functions, classes, and/or objects. Some or all code from multiple modules may be executed using a single (shared) processor. In addition, some or all code from multiple modules may be stored by a single (shared) memory. Further, some or all code from a single module may be executed using a group of processors. Moreover, some or all code from a single module may be stored using a group of memories.

The apparatuses and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system. By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

The description below is merely illustrative in nature and is in no way intended to limit the invention, its application, or uses. The broad teachings of the invention can be implemented in a variety of forms. Therefore, while this invention includes particular examples, the true scope of the invention should not be so limited since other modifications will become apparent upon a study of the drawings, the specification, and the following claims. For purposes of clarity, the same reference numbers will be used in the drawings to identify similar elements. It should be understood that one or more steps within a method may be executed in different order (or concurrently) without altering the principles of the invention.

As discussed above, when a lidar is mounted in a vehicle such as an autonomous car, there are some circumstances that the lidar may be off its calibrated position, thus introducing an unwanted angular offset to the point cloud. For example, it is possible that the lidar is off its calibrated position after service, repairing, or replacement at the dealerships due their service department lacking precise installation tools and calibration setups. Also, the vehicle might experience tilt on the pitch and roll direction due to (but not limited to) the following reasons: tire pressure changes and/or passenger or cargo load variation. Since the lidar is calibrated according to the chassis and the point cloud is displayed on the coordinates of the vehicle, any tilt happens on the car will apply to the lidar.

In view of the aforementioned issues, certain aspects of the present invention provide a system and method for performing lidar self-calibration, in which a lidar sensor is applied with corresponding computer executable instructions to perform the self-calibration process. In certain embodiments, for example, the lidar sensor may obtain a lidar reference signal based on a plurality of reference objects corresponding to the vehicle, determine a tilt angle of the lidar sensor based on the lidar reference signal, and isolate the tilt angle into a plurality of isolated angles, wherein the isolated angles include a pitch, a row and a yaw. For each corresponding isolated angle of the isolated angles, the lidar sensor may determine, based on a corresponding calibration criteria, a corresponding offset between the lidar sensor and the vehicle for the corresponding isolated angle, and perform a compensation to the corresponding isolated angle based on the corresponding offset. In this case, the lidar itself is utilized as the position sensor.

FIG. 1 shows schematically an overall architecture of a lidar system according to one embodiment of the invention. As shown in FIG. 1, the system 100 includes a lidar sensor 110, which is communicatively connected to a host computing device 120 through a network 130. It should be noted that, although only one lidar sensor 110 is shown in FIG. 1, the lidar system 100 may include multiple lidar sensors 110, and in this case, each lidar sensor 110 may be independently operated.

Figure 2A:
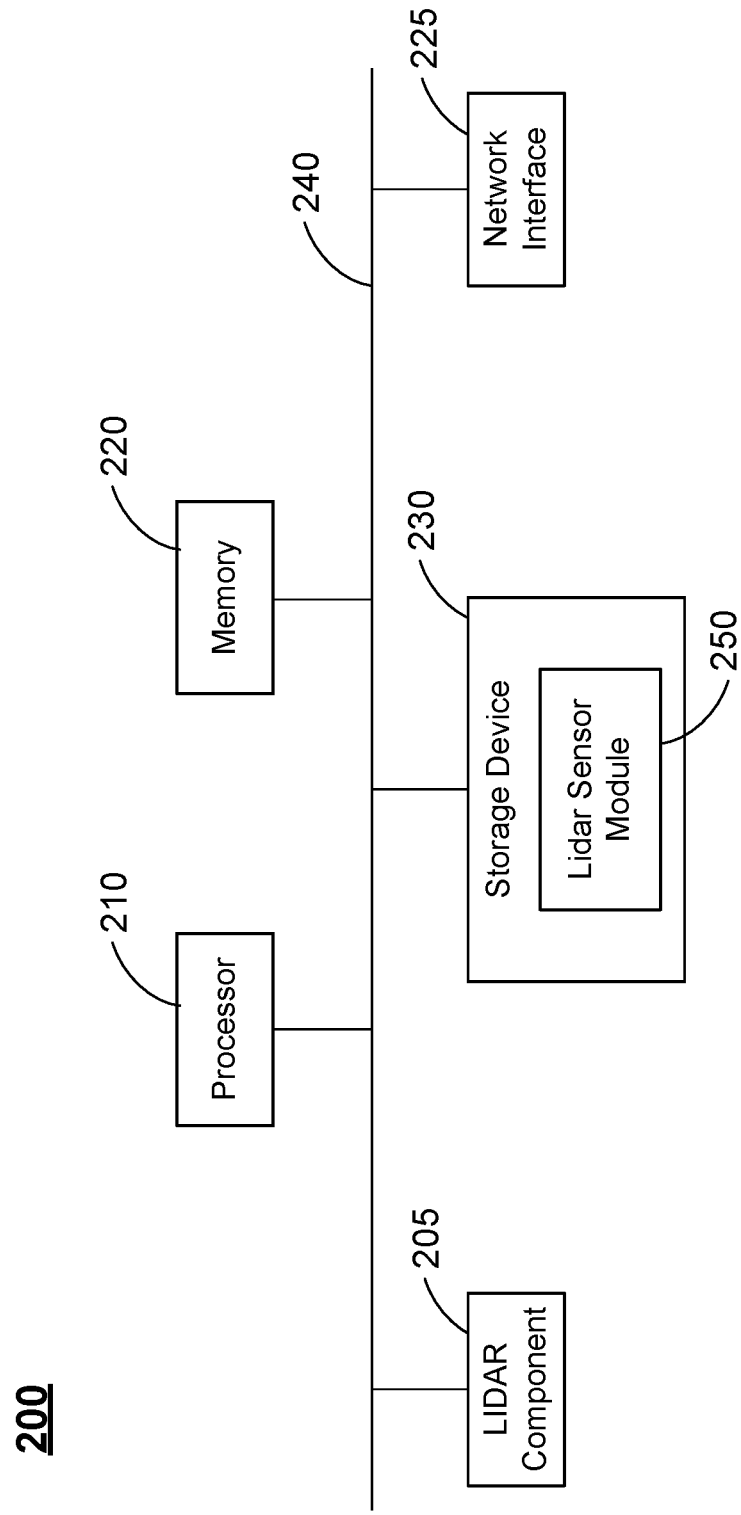
FIG. 2A shows schematically a lidar sensor according to one embodiment of the invention.

FIG. 2A shows schematically a lidar sensor according to one embodiment of the invention. Specifically, the lidar sensor 200 as shown in FIG. 2A is used as the lidar sensor 110 of the system 100 as shown in FIG. 1. As shown in FIG. 2A, the lidar sensor 200 includes a lidar component 205, a processor 210, a memory 220, a network interface 225, and a storage device 230, and a bus 240 interconnecting the lidar component 205, the processor 210, the memory 220, the network interface 225 and the storage device 230. In one embodiment, the processor 210, the memory 220 and the storage device 230 may be in the form of an ASIC. In certain embodiments, the lidar sensor 200 may include necessary hardware and/or software components (not shown) to perform its corresponding tasks. Examples of these hardware and/or software components may include, but not limited to, other required memory modules, interfaces, buses, Input/Output (I/O) modules and peripheral devices, and details thereof are not elaborated herein.

The lidar component 205 is the component providing lidar functions. In certain embodiments, the lidar component 205 may include a lidar transceiver, or a combination of a laser and a receiver. For example, the lidar component 205 may emit an output laser light beam toward an outer environment. In this case, the output laser light beam may be reflected by an external surface in the outer environment. In certain embodiment, the external surface may be a surface of the road, a building, another vehicle, or any other structure existing in the outer environment. The lidar component 205 then receives the reflected laser light beam as an input laser light beam. Thus, data corresponding to the output laser light beam and the corresponding input laser light beam may be collected and provided for calculation of the lidar information and the lidar self-calibration procedures.

The processor 210 controls operation of the lidar sensor 200, which may be used to execute any computer executable code or instructions. In certain embodiments, the processor 210 may be a central processing unit (CPU), and the computer executable code or instructions being executed by the processor 210 may include an operating system (OS) and other applications, codes or instructions stored in the lidar sensor 200. In certain embodiments, the lidar sensor 200 may run on multiple processors, which may include any suitable number of processors.

The memory 220 may be a volatile memory module, such as the random-access memory (RAM), for storing the data and information during the operation of the lidar sensor 200. In certain embodiments, the memory 220 may be in the form of a volatile memory array. In certain embodiments, the lidar sensor 200 may run on more than one memory 220.

The network interface 225 is an interface for communication with the network. In certain embodiments, the network interface 225 may be an Ethernet interface.

The storage device 230 is a non-volatile storage media or device for storing the computer executable code or instructions, such as the OS and the software applications for the lidar sensor 200. Examples of the storage device 230 may include flash memory, memory cards, USB drives, or other types of non-volatile storage devices such as hard drives, floppy disks, optical drives, or any other types of data storage devices. In certain embodiments, the lidar sensor 200 may have more than one storage device 230, and the software applications of the lidar sensor 200 may be stored in the more than one storage device 230 separately.

Figure 2B:
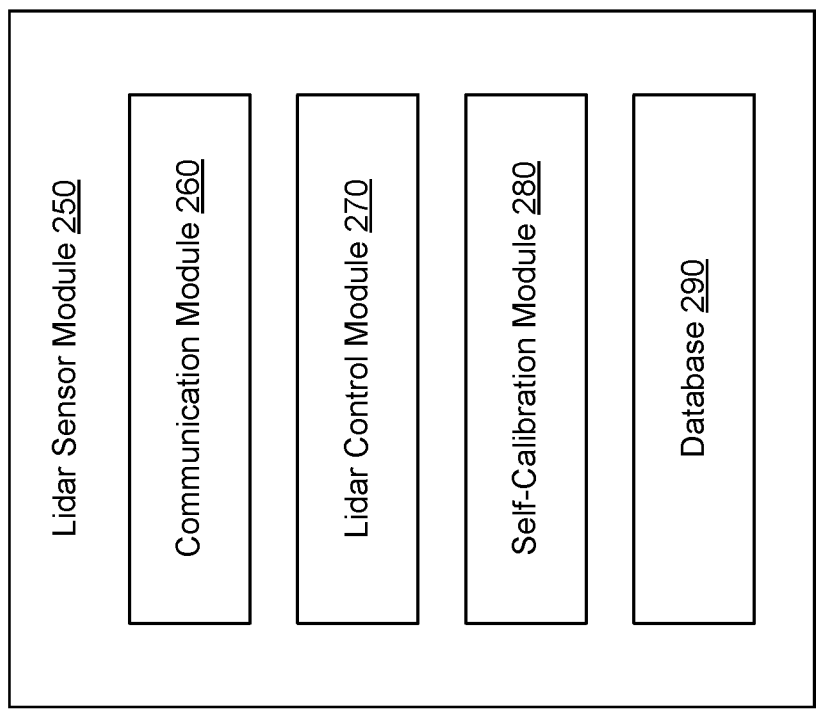
FIG. 2B shows schematically the lidar sensor module in the lidar sensor as shown in FIG. 2A according to one embodiment of the invention.

As shown in FIG. 2A, the computer executable code stored in the storage device 230 may include a lidar sensor module 250. Specifically, the lidar sensor module 250 is in the form of a software module which, when executed, allows the lidar sensor 200 to be in communication with the host computing device through the lidar communication protocol. FIG. 2B shows schematically the lidar sensor module in the lidar sensor as shown in FIG. 2A according to one embodiment of the invention. Specifically, the lidar sensor module 250 as shown in FIG. 2B includes a communication module 260, a lidar control module 270, a self-calibration module 280, and a database 290.

The communication module 260 is used to control the network interface 225 to control the network communication. In certain embodiments, the communication module 260 may be a network module, which in charge of the network communication between the lidar sensor 110 and the network 130 as shown in FIG. 1. For example, when the the network interface 225 is an Ethernet interface, the communication module 260 may be in charge of the Ethernet and TCP/IP control.

The lidar control module 270 is used to control the lidar functions of the lidar component 205. As discussed above, the lidar component 205 may emit an output laser light beam toward an outer environment, and then receives the reflected laser light beam as an input laser light beam. Thus, the lidar control module 270 controls the emission of the output laser light beam and the receipt/collection of the corresponding input laser light beam, as well as the corresponding calculation of the lidar information and the lidar self-calibration procedures.

The self-calibration module 280 is used to control the self-calibration process of the lidar sensor 200. Specifically, in operation, the self-calibration module 280 may control the lidar control module 270 to detect the outer environment, in order to obtain lidar reference signal based on a plurality of reference objects. Once the lidar reference signal is obtained, the self-calibration module 280 may determine a tilt angle of the lidar sensor based on the lidar reference signal. For calculation purposes, the tilt angle may be isolated into a plurality of isolated angles, including a pitch, a row and a yaw. In this case, for each corresponding isolated angle (e.g., the pitch, the row and the yaw), the self-calibration module 280 may determine, based on a corresponding calibration criteria, a corresponding offset between the lidar sensor and the vehicle for the corresponding isolated angle, and then perform a compensation to the corresponding isolated angle based on the corresponding offset.

Figure 3:
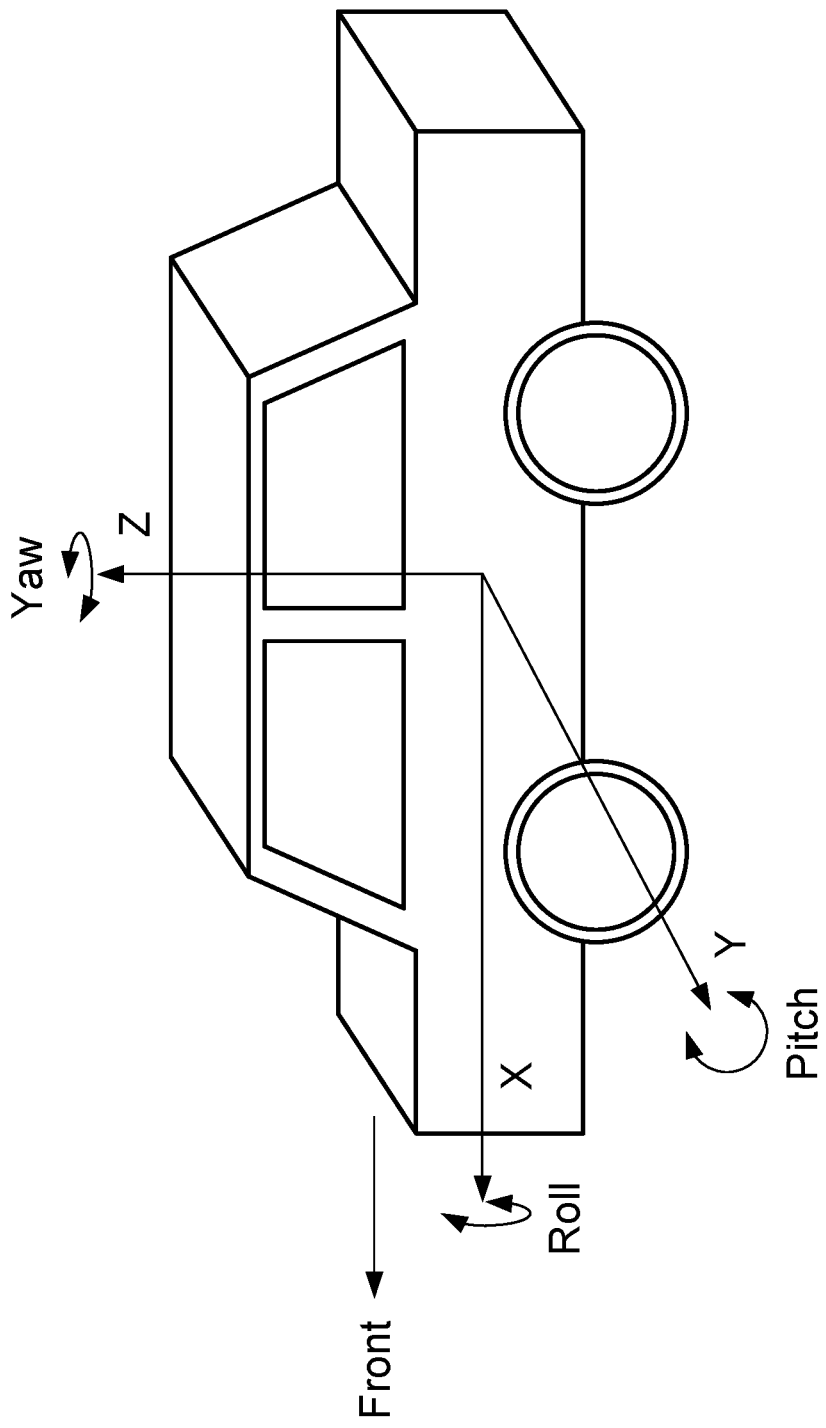
FIG. 3 shows schematically the roll, pitch and yaw of a vehicle according to one embodiment of the invention.

FIG. 3 shows schematically the roll, pitch and yaw of a vehicle according to one embodiment of the invention. Specifically, as shown in FIG. 3A, a three-dimensional coordinate (X, Y, Z) is provided for the vehicle 300, in which the X-axis indicates the front-rear direction of the vehicle 300 (which is the moving direction of the vehicle), the Y-axis indicates the left-right direction of the vehicle 300, and the Z-axis indicates the vertical direction of the vehicle 300. Thus, the roll direction is the rotational direction along the X-axis, the pitch direction is the rotational direction along the Y-axis, and the yaw direction is the rotational direction along the Z-axis. In other words, the X-axis is defined as the roll axis, the Y-axis is defined as the pitch axis, and the Z-axis is defined as the yaw axis.

Figure 4:
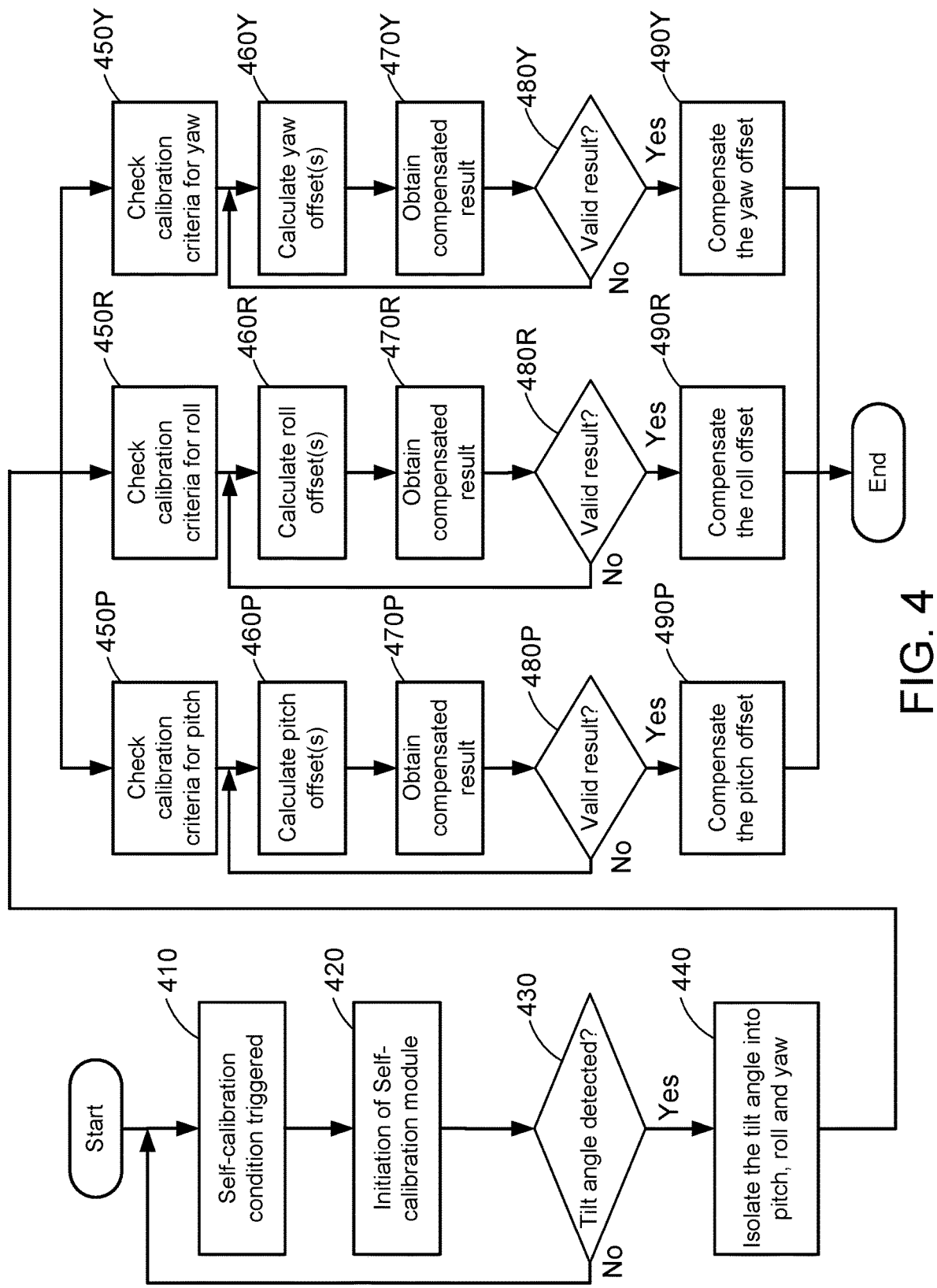
FIG. 4 shows a flowchart of a method for performing lidar self-calibration for a lidar sensor on a vehicle according to certain embodiments of the invention.

FIG. 4 shows a flowchart of a method for performing lidar self-calibration for a lidar sensor on a vehicle according to certain embodiments of the invention. In certain embodiments, the method as shown in FIG. 4 may be implemented by the lidar sensor 110 as shown in FIG. 1, the lidar sensor 200 as shown in FIG. 2A, and/or the self-calibration module 280 as shown in FIG. 2B. It should be particularly noted that, unless otherwise stated in the present disclosure, the steps of the method may be arranged in a different sequential order, and are thus not limited to the sequential order as shown in FIG. 4.

As shown in FIG. 4, at process 410, a self-calibration condition may be triggered, and at process 420, the self-calibration module is initiated. For example, the self-calibration condition may include, without being limited thereto, the initiation/restart of the lidar sensor (e.g., after service, repair or replacement of the lidar sensor), an extreme road condition (such as bumpy or muddy ground conditions) detected by the lidar sensor, a timer (which allows the self-calibration process to be performed regularly and periodically), or a manual instruction inputted by the user/operator of the vehicle. Once the self-calibration module is initiated, at process 430, the lidar sensor (or the self-calibration module thereof) determines whether a tilt angle of the lidar sensor is detected. Examples of the detection of the tilt angle will be further elaborated later in details. In the case where no tilt angle is detected, the process of the self-calibration module ends, and the lidar sensor may return to the process 410 until the next self-calibration condition is triggered. On the other hand, when the self-calibration module determines that a tilt angle is detected, at process 440, the self-calibration module may isolate the tilt angle into multiple isolated angles, including the pitch, the roll and the yaw as shown in FIG. 3. In this case, the three different isolated angles may be processed individually to perform calculation and corresponding compensation.

Using the pitch as an example, at process 450P, the self-calibration module checks the corresponding calibration criteria for the pitch, and at process 460P, the self-calibration module calculates the corresponding offset between the lidar sensor and the vehicle for the pitch (i.e., the pitch offset). In certain embodiments, one or more pitch offsets may be obtained. In the case where multiple consecutive pitch offsets are obtained, at process 470P, the self-calibration module obtains a corresponding compensated result based on the values of the consecutive corresponding pitch offsets, and at process 480P, the self-calibration module determines whether the compensated result for the pitch offsets is valid. For example, if the values of the consecutive corresponding pitch offsets are identical (or alternatively, the difference between the values of the consecutive corresponding pitch offsets are within a certain range), the self-calibration module may determine the compensated result for the pitch offsets to be valid. In this case, at process 490P, the self-calibration module may perform compensation to the corresponding pitch offset. On the other hand, if the values of the consecutive corresponding pitch offsets are different (or alternatively, the differences between the values of the consecutive corresponding pitch offsets are over a threshold), the self-calibration module may determine the compensated result for the pitch offsets to be invalid. In this case, the self-calibration module may return to the process 460P to further calculate additional corresponding pitch offset (or multiple corresponding pitch offsets) in order to obtain a valid compensated result.

Similarly, for the roll, at process 450R, the self-calibration module checks the corresponding calibration criteria for the roll, and at process 460R, the self-calibration module calculates the corresponding offset between the lidar sensor and the vehicle for the roll (i.e., the roll offset). In certain embodiments, one or more roll offsets may be obtained. In the case where multiple consecutive roll offsets are obtained, at process 470R, the self-calibration module obtains a corresponding compensated result based on the values of the consecutive corresponding roll offsets, and at process 480R, the self-calibration module determines whether the compensated result for the roll offsets is valid. For example, if the values of the consecutive corresponding roll offsets are identical (or alternatively, the difference between the values of the consecutive corresponding roll offsets are within a certain range), the self-calibration module may determine the compensated result for the roll offsets to be valid. In this case, at process 490R, the self-calibration module may perform compensation to the corresponding roll offset. On the other hand, if the values of the consecutive corresponding roll offsets are different (or alternatively, the differences between the values of the consecutive corresponding roll offsets are over a threshold), the self-calibration module may determine the compensated result for the roll offsets to be invalid. In this case, the self-calibration module may return to the process 460R to further calculate additional corresponding roll offset (or multiple corresponding roll offsets) in order to obtain a valid compensated result.

Similarly, for the yaw, at process 450Y, the self-calibration module checks the corresponding calibration criteria for the yaw, and at process 460Y, the self-calibration module calculates the corresponding offset between the lidar sensor and the vehicle for the yaw (i.e., the yaw offset). In certain embodiments, one or more yaw offsets may be obtained. In the case where multiple consecutive yaw offsets are obtained, at process 470Y, the self-calibration module obtains a corresponding compensated result based on the values of the consecutive corresponding yaw offsets, and at process 480Y, the self-calibration module determines whether the compensated result for the yaw offsets is valid. For example, if the values of the consecutive corresponding yaw offsets are identical (or alternatively, the difference between the values of the consecutive corresponding yaw offsets are within a certain range), the self-calibration module may determine the compensated result for the yaw offsets to be valid. In this case, at process 490Y, the self-calibration module may perform compensation to the corresponding yaw offset. On the other hand, if the values of the consecutive corresponding yaw offsets are different (or alternatively, the differences between the values of the consecutive corresponding yaw offsets are over a threshold), the self-calibration module may determine the compensated result for the yaw offsets to be invalid. In this case, the self-calibration module may return to the process 460Y to further calculate additional corresponding yaw offset (or multiple corresponding yaw offsets) in order to obtain a valid compensated result. Once the method for performing lidar self-calibration as shown in FIG. 4 is performed, compensation for each of the pitch offset (process 490P), the roll offset (process 490R) and the yaw offset (process 490Y) are performed, and the point cloud should be corrected to be upright.

It should be noted that, as shown in FIG. 4, the calculation and compensation for each of the pitch offset (processes 450P to 490P), the roll offset (processes 450R to 490R) and the yaw offset (processes 450Y to 490Y) are performed separately, and may be performed using separate different algorithms. In certain embodiments, however, certain calculation and/or compensation processes between the three isolated angles may be combined, and is not limited to the processes as shown in FIG. 4. For example, the compensation processes 490P, 490R and 490Y may be combined as one single compensation process, where a combined compensation for the overall tilt angle is performed to compensate all of the pitch, roll and yaw offsets.

Figure 5A:
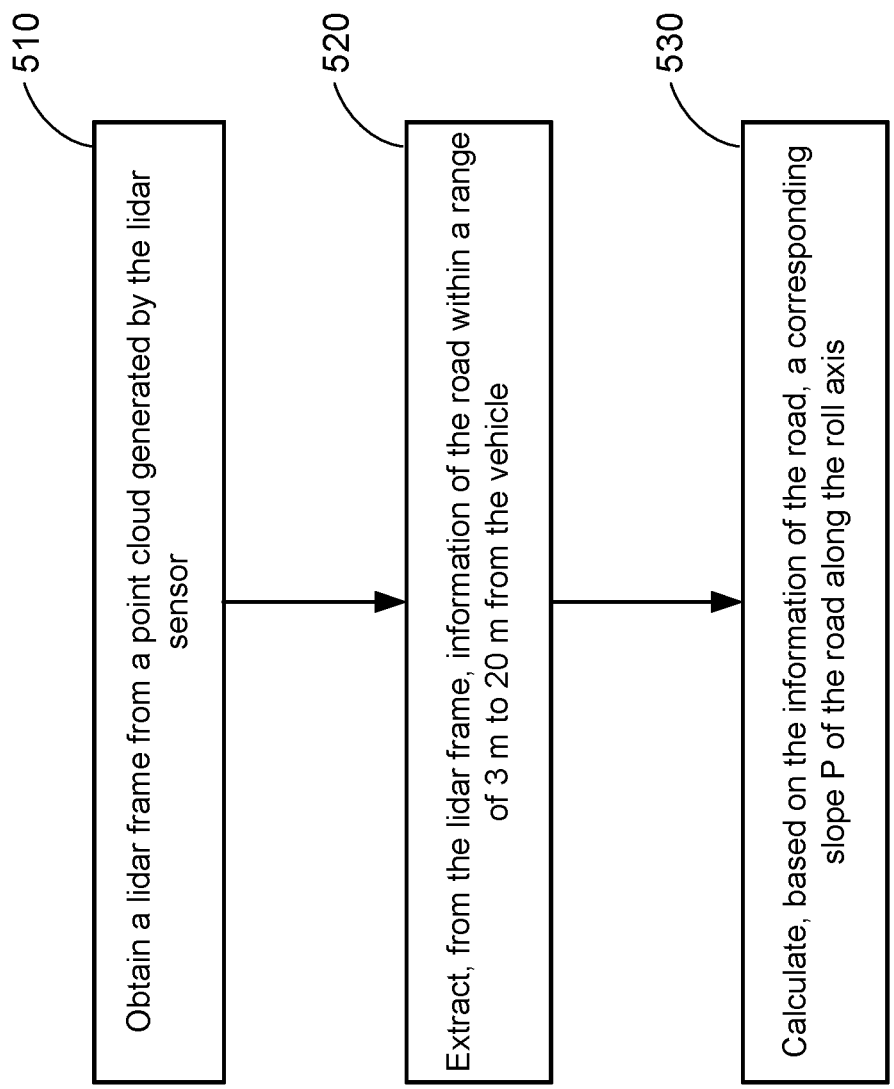
FIG. 5A shows a flowchart of the process of detecting the pitch of the tilt angle according to certain embodiments of the invention.
Figure 5B:
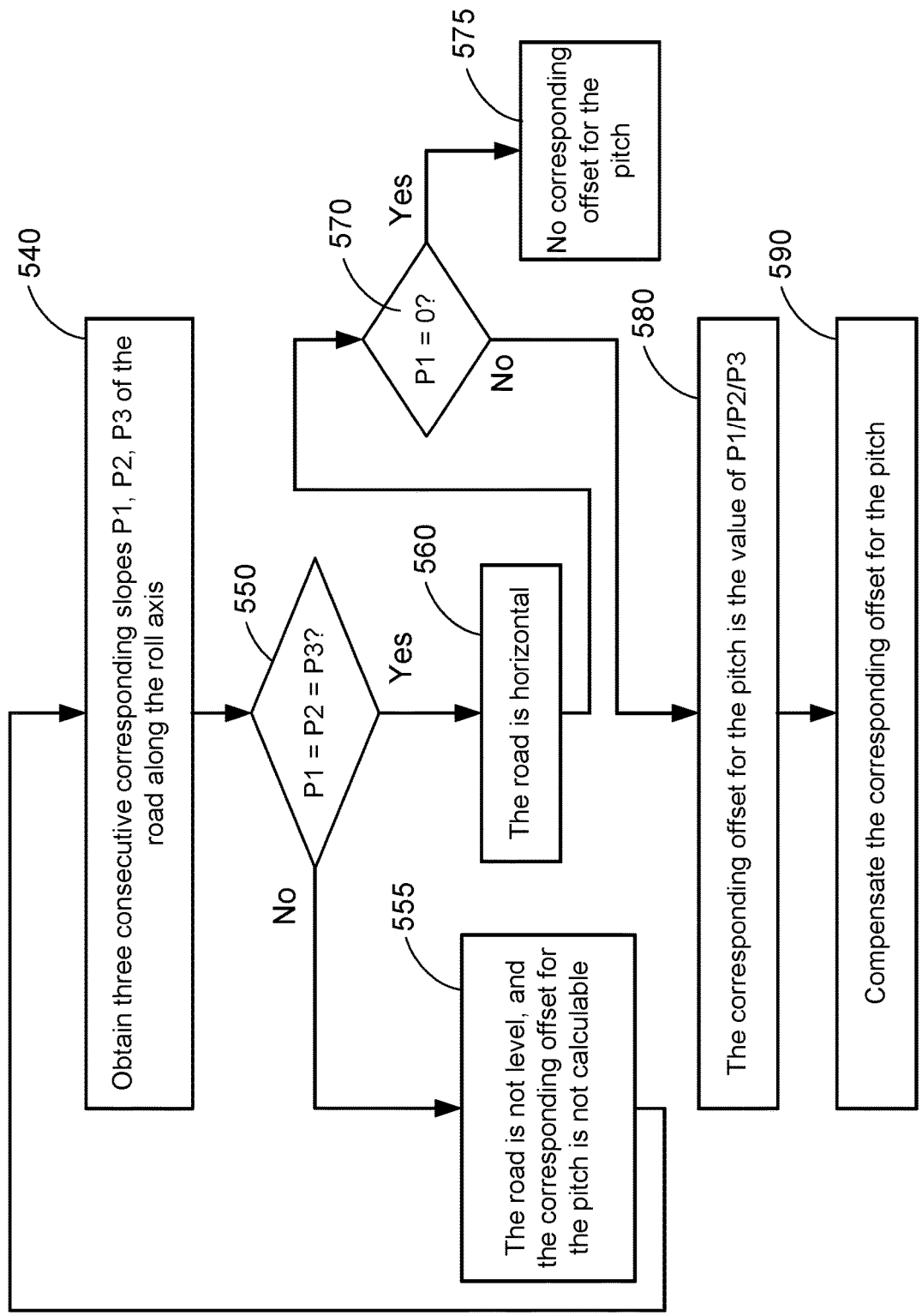
FIG. 5B shows a flowchart of the process of compensating the pitch offset according to certain embodiments of the invention.

In certain embodiments, the detection and compensation of the tilt angle may be performed individually by each of the isolated angles. For example, FIG. 5A shows a flowchart of the process of detecting the pitch of the tilt angle according to certain embodiments of the invention, and FIG. 5B shows a flowchart of the process of compensating the pitch offset according to certain embodiments of the invention. In certain embodiments, the processes as shown in FIGS. 5A and 5B may be implemented by the lidar sensor 110 as shown in FIG. 1, the lidar sensor 200 as shown in FIG. 2A, and/or the self-calibration module 280 as shown in FIG. 2B. It should be particularly noted that, unless otherwise stated in the present disclosure, the steps of the method may be arranged in a different sequential order, and are thus not limited to the sequential order as shown in FIGS. 5A and 5B. Moreover, the processes as shown in FIGS. 5A and 5B are performed with a presumption that the vehicle is operated (i.e., driven and moving) on a standard road, where the road surface fulfills the flatness requirements (i.e., the road is generally flat without a significant slope along the road).

As shown in FIG. 5A, at process 510, the self-calibration module obtains a lidar frame from a point cloud generated by the lidar sensor. Specifically, the data in the point cloud are obtained based on signal obtained by the lidar control module 270 as shown in FIG. 2B. At process 520, the self-calibration module extracts, from the lidar frame, information of the road within a range of 3 m to 20 m from the vehicle. In this case, the road is used as a reference object corresponding to the vehicle. Since the information of the road is used as the reference information for determination of the pitch offset, the signals obtained by the lidar control module 270 (i.e., the base for the point cloud, from which the information of the road is obtained) function as the lidar reference signals. Once the information of the road is obtained, at process 530, the self-calibration module calculates, based on the information of the road, a corresponding slope P of the road along the roll axis. Since the road is presumably flat (i.e., without a slope along the roll axis), the corresponding slope P of the road along the roll axis should also be zero if there is no pitch offset for the lidar sensor. In other words, if a non-zero pitch offset exists for the lidar sensor, the corresponding slope P of the road along the roll axis being obtained may not be zero.

It should be noted that the processes 510 to 530 as shown in FIG. 5A may be performed repeatedly and periodically in order to obtain multiple corresponding slopes P of the road along the roll axis. Thus, the pitch offset may be determined by the corresponding slopes P. In certain embodiments, for example, the processes 510 to 530 may be performed twice within a distance of about every 5 meters (i.e., about 0.4 second at a speed of 45 km/hour). In this case, within a distance of about 5 meters, three consecutive corresponding slopes P1, P2 and P3 of the road along the roll axis may be obtained.

As shown in FIG. 5B, at process 540, three consecutive corresponding slopes P1, P2 and P3 of the road along the roll axis may be obtained (e.g., by repeatedly performing the processes 510 to 530 as shown in FIG. 5A for three times). Once the three consecutive corresponding slopes P1, P2 and P3 are obtained, at process 550, the self-calibration module determines whether the values of the three consecutive corresponding slopes P1, P2 and P3 are equal (i.e., whether P1=P2=P3). In the case where the values of the three consecutive corresponding slopes P1, P2 and P3 are different, at process 555, the self-calibration module determines that the road is not level (i.e., not flat along the roll axis), as indicated by the different values of the slopes of the road. In this case, the corresponding pitch offset is not calculable using the different values of the three consecutive corresponding slopes P1, P2 and P3. In this case, the self-calibration module may wait for a period of time (e.g., 5 seconds), and then return to process 540 (i.e., performing the processes 510 to 530 as shown in FIG. 5A) to obtain three new consecutive corresponding slopes of the road.

On the other hand, when the values of the three consecutive corresponding slopes P1, P2 and P3 are equal, at process 560, the self-calibration module determines that the road is horizontally level (i.e., flat along the roll axis). In this case, at process 570, the self-calibration module further determines whether the value of the slope P1 (which is identical to the values of the slopes P2 and P3) is zero. Since the road is presumably flat (i.e., without a slope along the roll axis), if the value of the slope P1 is zero (i.e., P1=0), at process 575, the self-calibration module determines that the road is indeed flat (i.e., no slope along the roll axis), and there is no corresponding pitch offset for the lidar sensor. In this case, no compensation for the pitch is required. On the other hand, if the slope P1 has a non-zero value (i.e., P1=$\theta$ and $\theta$!=0), at process 580, the self-calibration module determines that the lidar sensor has a corresponding offset for the pitch, which is the non-zero value $\theta$ of the slope P1 (and is identical to the values of the slopes P2 and P3). Thus, at process 590, the self-calibration module may perform the compensation to the corresponding pitch offset $\theta$.

It should be noted that, in the processes 540 to 590 as shown in FIG. 5B, three consecutive corresponding slopes P1, P2 and P3 of the road along the roll axis are utilized to determine the pitch of the tilt angle for the lidar sensor. In certain embodiments, the pitch of the tilt angle may be determined using different numbers of consecutive corresponding slopes of the road along the roll axis. Further, as discussed above, the processes 540 to 580 as shown in FIG. 5B may be repeatedly performed for multiple times in order to obtain a compensated result, and the compensation at the process 590 may be performed only when the compensated result is valid.

Figure 6A:
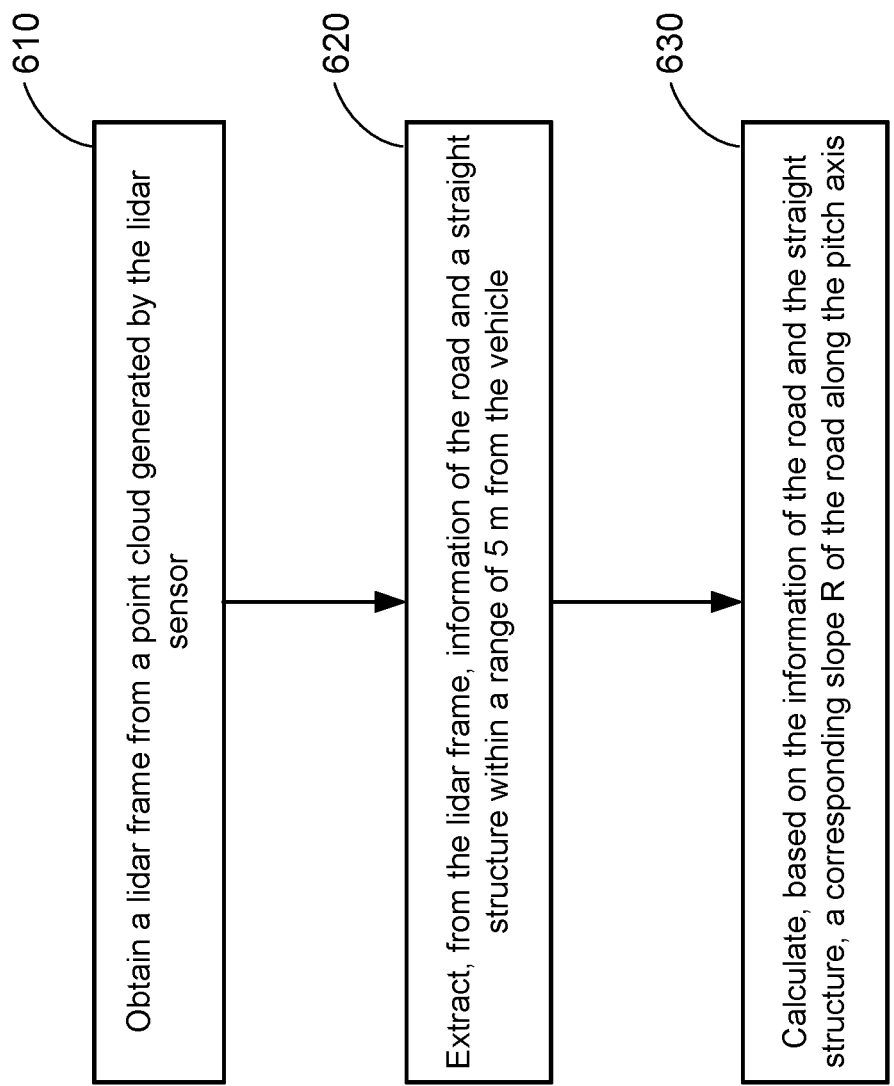
FIG. 6A shows a flowchart of the process of detecting the roll of the tilt angle according to certain embodiments of the invention.
Figure 6B:
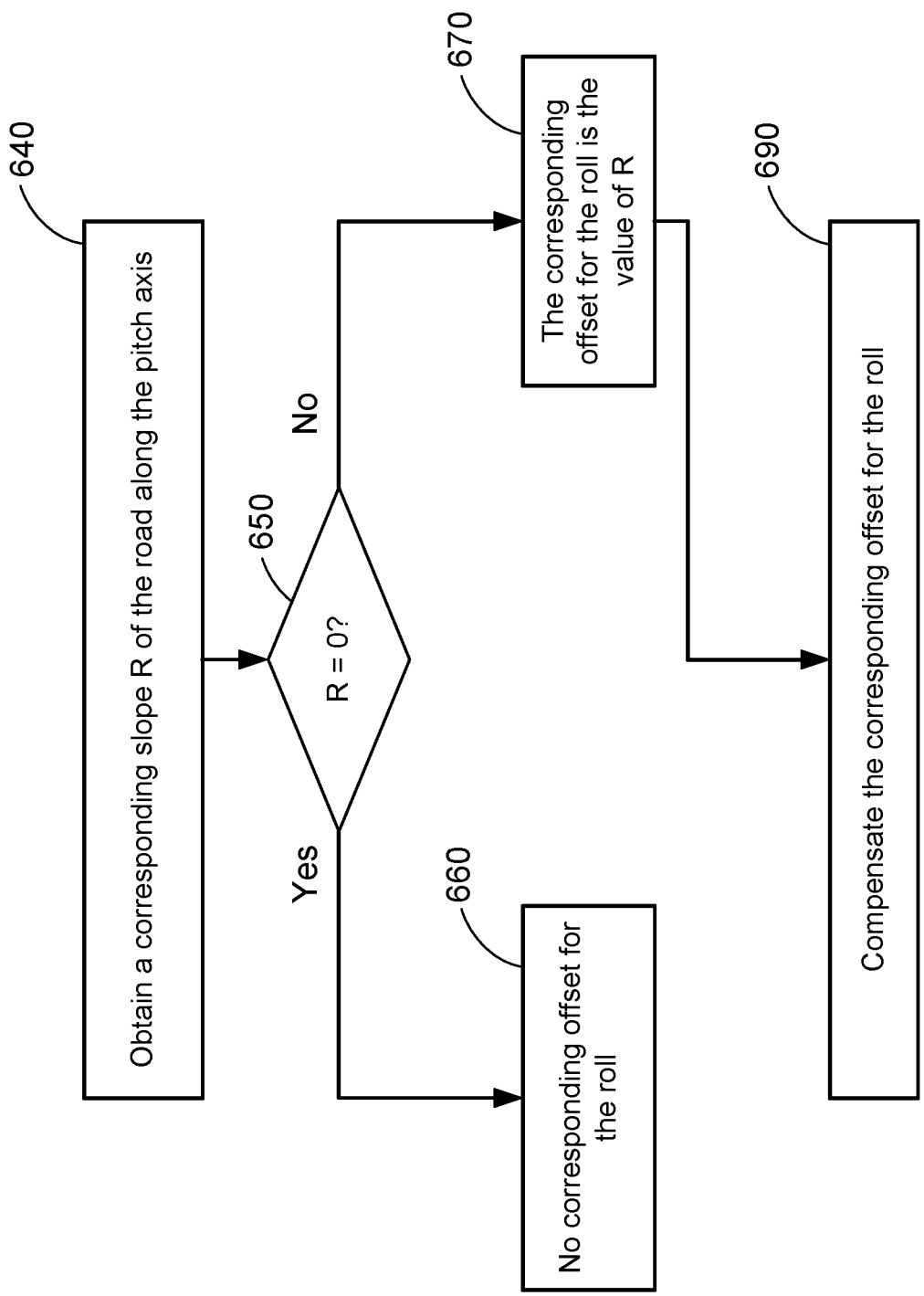
FIG. 6B shows a flowchart of the process of compensating the roll offset according to certain embodiments of the invention.

FIG. 6A shows a flowchart of the process of detecting the roll of the tilt angle according to certain embodiments of the invention, and FIG. 6B shows a flowchart of the process of compensating the roll offset according to certain embodiments of the invention. In certain embodiments, the processes as shown in FIGS. 6A and 6B may be implemented by the lidar sensor 110 as shown in FIG. 1, the lidar sensor 200 as shown in FIG. 2A, and/or the self-calibration module 280 as shown in FIG. 2B. It should be particularly noted that, unless otherwise stated in the present disclosure, the steps of the method may be arranged in a different sequential order, and are thus not limited to the sequential order as shown in FIGS. 6A and 6B. Moreover, the processes as shown in FIGS. 6A and 6B are performed with a presumption that the vehicle is operated (i.e., driven and moving) on a standard road, where the road surface fulfills the flatness requirements (i.e., the road is generally flat without a significant slope along the road), and one or more corresponding straight structures (such as building walls, street light pillars, or other straight structures along the road) exist.

As shown in FIG. 6A, at process 610, the self-calibration module obtains a lidar frame from a point cloud generated by the lidar sensor. Specifically, the data in the point cloud are obtained based on signal obtained by the lidar control module 270 as shown in FIG. 2B. At process 620, the self-calibration module extracts, from the lidar frame, information of the road and a straight structure within a range of about 5 m from the vehicle. In this case, the road and the straight structure are used as reference objects corresponding to the vehicle. Since the information of the road and the straight structure is used as the reference information for determination of the pitch offset, the signals obtained by the lidar control module 270 (i.e., the base for the point cloud, from which the information of the road and the straight structure is obtained) function as the lidar reference signals. Once the information of the road and the straight structure is obtained, at process 630, the self-calibration module calculates, based on the information of the road and the straight structure, a corresponding slope R of the road along the pitch axis. Since the road is presumably flat (i.e., without a slope along the pitch axis), the corresponding slope R of the road along the pitch axis should also be zero if there is no roll offset for the lidar sensor. In other words, if a non-zero roll offset exists for the lidar sensor, the corresponding slope R of the road along the pitch axis being obtained may not be zero.

It should be noted that the processes 610 to 630 as shown in FIG. 6A may be performed repeatedly and periodically in order to obtain multiple corresponding slopes R of the road along the pitch axis. Thus, the roll offset may be determined by the corresponding slopes R. On the other hand, since the straight structure (i.e., building walls, street light pillars, or other straight structures along the road) is required, it is also possible that the processes 610 to 630 as shown in FIG. 6A may be performed only once the obtain a single slope R of the road along the pitch axis, and the roll offset may be determined by the single slope R.

As shown in FIG. 6B, at process 640, a corresponding slope R of the road along the pitch axis may be obtained (e.g., by performing the processes 510 to 530 as shown in FIG. 5A once). Once the corresponding slope R is obtained, at process 650, the self-calibration module determines whether the value of the corresponding slope R is zero (i.e., whether R=0). Since the road is presumably flat (i.e., without a slope along the pitch axis), if the value of the slope R is zero (i.e., P1=0), at process 660, the self-calibration module determines that the road is indeed flat (i.e., no slope along the pitch axis), and there is no corresponding roll offset for the lidar sensor. In this case, no compensation for the roll is required. On the other hand, if the slope R has a non-zero value (i.e., R=$\beta$ and $\beta$!=0), at process 670, the self-calibration module determines that the lidar sensor has a corresponding offset for the roll, which is the non-zero value θ of the slope R. Thus, at process 690, the self-calibration module may perform the compensation to the corresponding roll offset β.

It should be noted that, in the processes 640 to 690 as shown in FIG. 6B, one single corresponding slope R of the road along the pitch axis is utilized to determine the roll of the tilt angle for the lidar sensor. In certain embodiments, the roll of the tilt angle may be determined using different numbers of consecutive corresponding slopes of the road along the pitch axis, which may be similar to the processes 540 to 590 as shown in FIG. 5B. Further, as discussed above, the processes 640 to 670 as shown in FIG. 6B may be repeatedly performed for multiple times in order to obtain a compensated result, and the compensation at the process 690 may be performed only when the compensated result is valid.

FIG. 7A shows schematically detection for the yaw of the tilt angle using a parallel structure as the reference object according to certain embodiments of the invention. Specifically, since a vehicle is generally located two-dimensionally on the road, the yaw of the tilt angle may be calculated using a parallel structure along the road as a reference object. For example, as shown in FIG. 7A, a road line 705 may be used as the parallel structure, since the road line extends along the road. In the case where the road is straight (i.e., without a curve), the vehicle 700 should be moving along the roll axis (i.e., the X-axis). Thus, the parallel structure should be parallel along the roll axis in the case where there is no yaw offset for the lidar sensor. In other words, if a yaw of the tilt angle exists for the lidar sensor, a deviation between the parallel structure and the roll axis will be detected. Corresponding, due to the existence of the yaw of the tile angle, a distance between the detected area 708 of the parallel structure and the pitch axis may also be different.

Figure 7B:
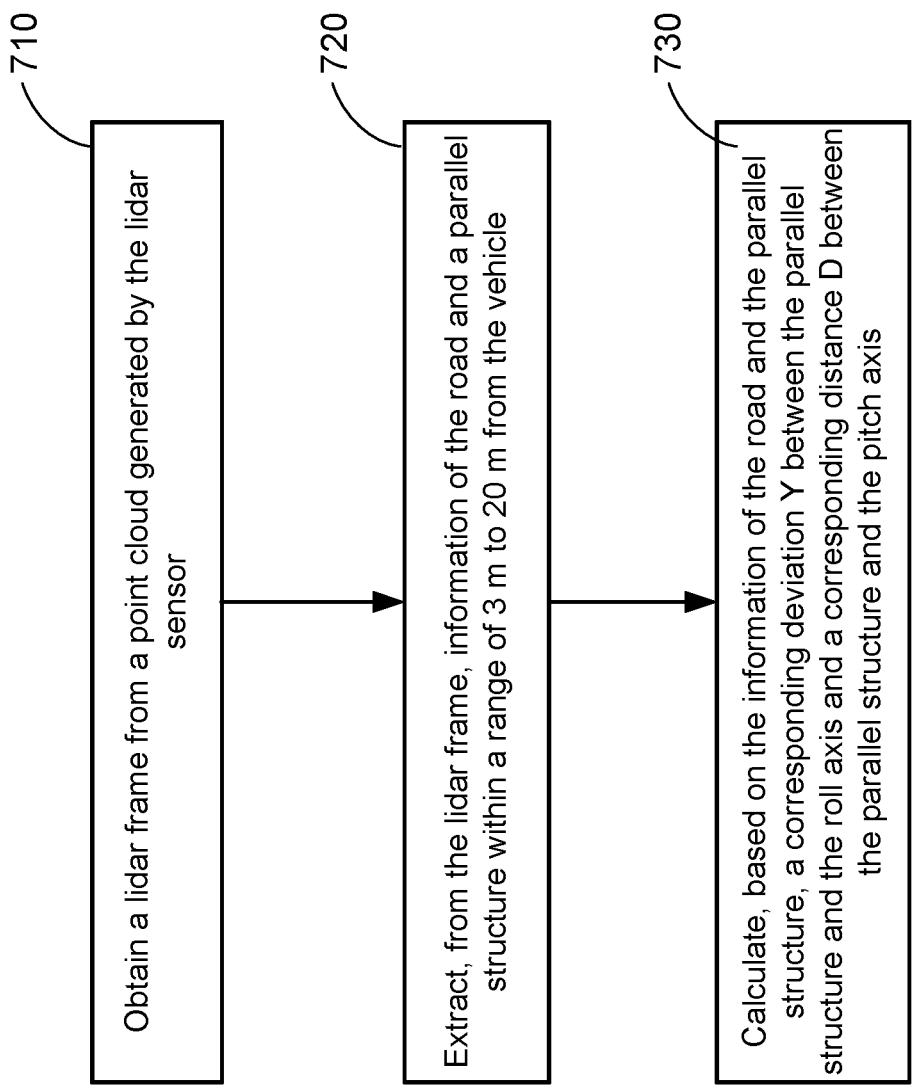
FIG. 7B shows a flowchart of the process of detecting the yaw of the tilt angle according to certain embodiments of the invention.
Figure 7C:
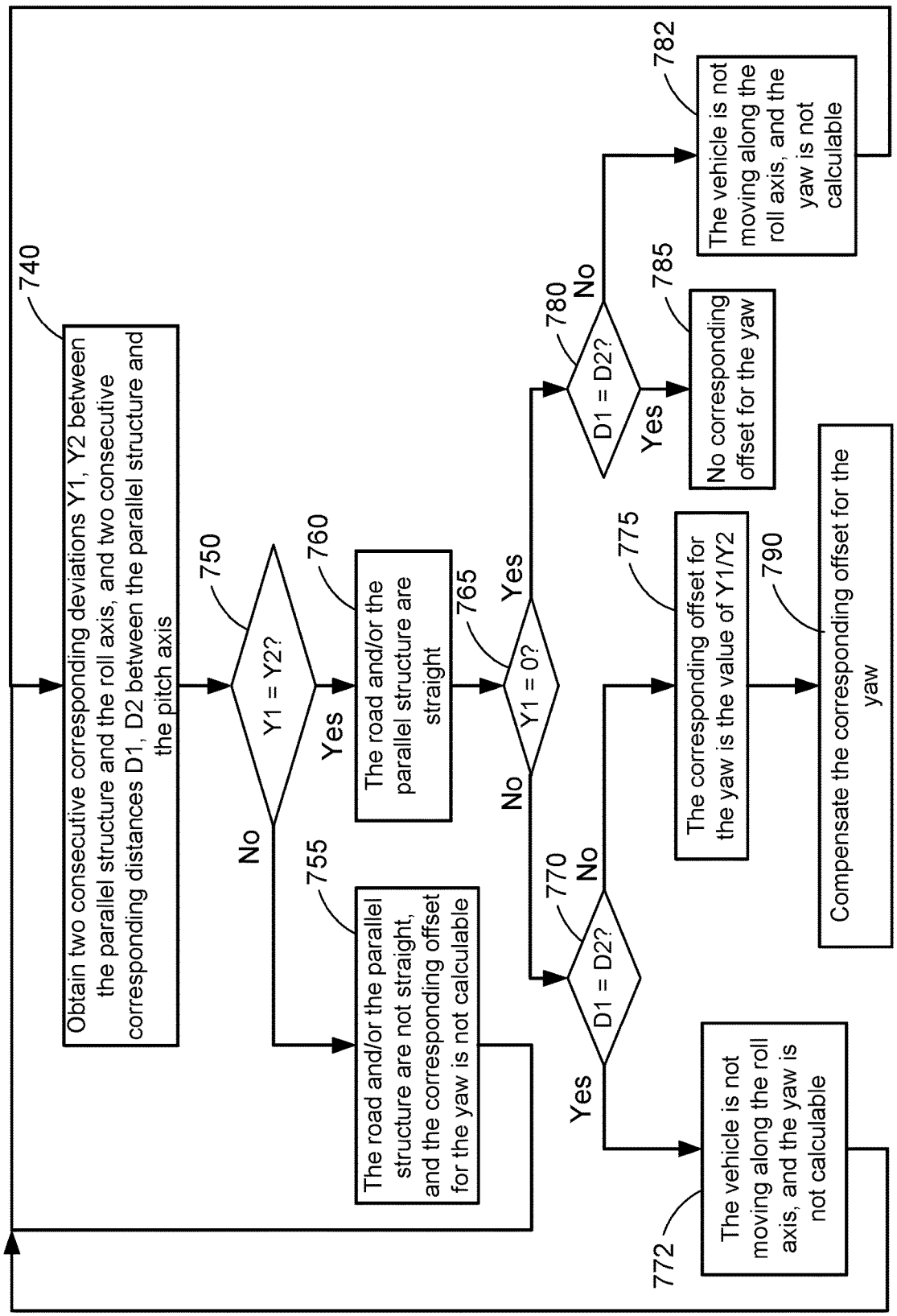
FIG. 7C shows a flowchart of the process of compensating the yaw offset according to certain embodiments of the invention.

FIG. 7B shows a flowchart of the process of detecting the yaw of the tilt angle according to certain embodiments of the invention, and FIG. 7C shows a flowchart of the process of compensating the yaw offset according to certain embodiments of the invention. In certain embodiments, the processes as shown in FIGS. 7B and 7C may be implemented by the lidar sensor 110 as shown in FIG. 1, the lidar sensor 200 as shown in FIG. 2A, and/or the self-calibration module 280 as shown in FIG. 2B. It should be particularly noted that, unless otherwise stated in the present disclosure, the steps of the method may be arranged in a different sequential order, and are thus not limited to the sequential order as shown in FIGS. 7B and 7C. Moreover, the processes as shown in FIGS. 7B and 7C are performed with a presumption that the vehicle is operated (i.e., driven and moving) on a standard road, where the road surface fulfills the flatness and straight requirements (i.e., the road is generally flat without a significant slope along the road, and is generally straight without a significant curve along the road)), and one or more corresponding parallel structures (such as the road line 705 as shown in FIG. 7A, a curb along the road, a road fence along the road, or other parallel structures along the road) exist along the road.

As shown in FIG. 7B, at process 710, the self-calibration module obtains a lidar frame from a point cloud generated by the lidar sensor. Specifically, the data in the point cloud are obtained based on signal obtained by the lidar control module 270 as shown in FIG. 2B. At process 720, the self-calibration module extracts, from the lidar frame, information of the road and the parallel structure (such as the road line 705 as shown in FIG. 7A) within a range of about 3 m to 20 m from the vehicle. In this case, the road and the parallel structure are used as reference objects corresponding to the vehicle. Since the information of the road and the parallel structure is used as the reference information for determination of the pitch offset, the signals obtained by the lidar control module 270 (i.e., the base for the point cloud, from which the information of the road and the parallel structure is obtained) function as the lidar reference signals. Once the information of the road and the straight structure is obtained, at process 630, the self-calibration module calculates, based on the information of the road and the parallel structure, a corresponding deviation Y between the parallel structure and the roll axis, and a corresponding distance D between the parallel structure and the pitch axis. Since the road and the parallel structure are both presumably straight (i.e., without any curve along the roll axis), the corresponding deviation Y between the parallel structure and the roll axis should be zero, and the corresponding distance D between the parallel structure and the pitch axis should be a constant value if there is no yaw offset for the lidar sensor. In other words, if a non-zero yaw offset exists for the lidar sensor, the corresponding deviation Y between the parallel structure and the roll axis should be a non-zero value, and the corresponding distance D between the parallel structure and the pitch axis should be variable.

It should be noted that the processes 710 to 730 as shown in FIG. 7B may be performed repeatedly and periodically in order to obtain multiple corresponding deviations Y and multiple corresponding distances D. Thus, the yaw offset may be determined by the corresponding deviations Y and the corresponding distances D. In certain embodiments, for example, the processes 510 to 530 may be performed about every 5 seconds. In this case, within a period of about 5 seconds, two consecutive corresponding deviations Y1 and Y2 as well as two consecutive corresponding distances D1 and D2 may be obtained.

As shown in FIG. 7C, at process 740, two consecutive corresponding deviations Y1 and Y2 as well as two consecutive corresponding distances D1 and D2 are obtained (e.g., by repeatedly performing the processes 710 to 730 as shown in FIG. 7B twice). Once the two consecutive corresponding deviations Y1 and Y2 and the two consecutive corresponding distances D1 and D2 are obtained, at process 750, the self-calibration module determines whether the values of the two consecutive corresponding deviations Y1 and Y2 are equal (i.e., whether Y1=Y2). In the case where the values of the two consecutive corresponding deviations Y1 and Y2 are different, at process 755, the self-calibration module determines that the road and/or the parallel structure may not be straight (i.e., a curve may exist along the road and/or the parallel structure), as indicated by the different values of the deviations Y1 and Y2. In this case, the corresponding yaw offset is not calculable using the different values of the two consecutive corresponding deviations Y1 and Y2. In this case, the self-calibration module may wait for a period of time (e.g., 5 seconds), and then return to process 740 (i.e., performing the processes 710 to 730 as shown in FIG. 7B) to obtain two new consecutive corresponding deviations and two new consecutive corresponding distances.

On the other hand, when the values of the two consecutive corresponding deviations Y1 and Y2 are equal, at process 760, the self-calibration module determines that the road and/or the parallel structure should be straight (i.e., without any curve along the roll axis). In this case, at process 765, the self-calibration module further determines whether the value of the deviation Y1 (which is identical to the values of the deviation Y2) is zero. Since the road is presumably straight (i.e., without any curve along the roll axis), if the deviation Y1 has a non-zero value (i.e., Y1=γ and γ!=0), it is likely that there is a yaw offset for the lidar sensor. Thus, at process 770, the self-calibration module further determines whether the values of the two consecutive corresponding distances D1 and D2 are equal (i.e., whether D1=D2). In the case where the values of the two consecutive corresponding distances D1 and D2 are equal (i.e., Y1!=0, but D1=D2), at process 772, the self-calibration module determines that the vehicle may not be moving along the roll axis, and it is unclear whether a yaw offset exists for the lidar sensor. In this case, the self-calibration module may generate a notice for the user/operator of the vehicle to correct the moving direction of the vehicle, and may wait for a period of time (e.g., 5 seconds) and then return to process 740 (i.e., performing the processes 710 to 730 as shown in FIG. 7B) to obtain two new consecutive corresponding deviations and two new consecutive corresponding distances. On the other hand, when the values of the two consecutive corresponding distances D1 and D2 are different (i.e., Y1!=0 and D1!=D2), at process 775, the self-calibration module determines that the lidar sensor has a corresponding offset for the yaw, which is the non-zero value γ of the deviation Y1 (and is identical to the value of the deviation Y2). Thus, at process 790, the self-calibration module may perform the compensation to the corresponding yaw offset γ.

Referring back to the process 765, if the value of the deviation Y1 is zero (i.e., Y1=0), at process 780, the self-calibration module also determines whether the values of the two consecutive corresponding distances D1 and D2 are equal (i.e., whether D1=D2). In the case where the values of the two consecutive corresponding distances D1 and D2 are different (i.e., Y1=0 but D1!=D2), at process 782, the self-calibration module also determines that the vehicle may not be moving along the roll axis, and it is unclear whether a yaw offset exists for the lidar sensor. In this case, the self-calibration module may generate a notice for the user/operator of the vehicle to correct the moving direction of the vehicle, and may wait for a period of time (e.g., 5 seconds) and then return to process 740 (i.e., performing the processes 710 to 730 as shown in FIG. 7B) to obtain two new consecutive corresponding deviations and two new consecutive corresponding distances. On the other hand, if the values of the two consecutive corresponding distances D1 and D2 are equal (i.e., Y1=0 and D1=D2), at process 785, the self-calibration module determines that there is no corresponding yaw offset for the lidar sensor. In this case, no compensation for the yaw is required.

It should be noted that, in the processes 740 to 790 as shown in FIG. 7C, two consecutive corresponding deviations Y1 and Y2 as well as two consecutive corresponding distances D1 and D2 are utilized to determine the yaw of the tilt angle for the lidar sensor. In certain embodiments, the yaw of the tilt angle may be determined using different numbers of consecutive corresponding deviations and different numbers of consecutive corresponding distances. Further, as discussed above, the processes 740 to 785 as shown in FIG. 7C may be repeatedly performed for multiple times in order to obtain a compensated result, and the compensation at the process 790 may be performed only when the compensated result is valid.

In the processes as shown in FIGS. 5A, 5B, 6A, 6B, 7B and 7C, different reference objects are used in order to calculate and compensate different isolated angles (pitch, roll and yaw). However, it should be noted that the processes as shown in FIGS. 5A, 5B, 6A, 6B, 7B and 7C may be performed simultaneously and/or separately using all of the reference objects. In certain embodiments, when it is determined that there is no compensation required for a certain isolated angle, it is possible to end the corresponding processes while the calculation/compensation processes for the other isolated angles are still performing. For example, when the self-calibration module determines that there is no compensation required for the yaw, the processes as shown in FIGS. 7B and 7C may end, while the processes as shown in FIGS. 5A and 5B (corresponding to the pitch) and the processes as shown in FIGS. 6A and 6B (corresponding to the roll) are still performing.

Yet another aspect of the invention provides a non-transitory tangible computer-readable medium storing instructions which, when executed by one or more processors of a system (such as the lidar sensor 110 as shown in FIG. 1 and/or the lidar sensor 200 as shown in FIG. 2A), cause the above disclosed method to be performed. The computer executable instructions or program codes enable the above disclosed system or a similar system, to complete various operations in accordance with the above disclosed method. The storage medium/memory may include, but is not limited to, high-speed random access medium/memory such as DRAM, SRAM, DDR RAM or other random access solid state memory devices, and non-volatile memory such as one or more magnetic disk storage devices, optical disk storage devices, flash memory devices, or other non-volatile solid state storage devices.

Yet a further aspect of the invention relates to a vehicle or an autonomous system having the system as described above.

The system and method as described above may be used to perform self-calibration for a lidar sensor on a vehicle. There is no need for another remote computing system or additional imaging devices, such as a camera or an inertial measurement (IMU), involved to perform the self-compensation process, as all of the self-compensation process may be performed on the lidar sensor. Further, the self-calibration process can be performed when the vehicle is running on the road instead of being performed in a specific calibration field. Moreover, compared to the existing in-vehicle lidar system, the system and method also only consume a slightly more computation power to perform the self-calibration process since the calibration requires only the collected point cloud to do so.

The foregoing description of the exemplary embodiments of the invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to enable others skilled in the art to utilize the invention and various embodiments and with various modifications as are suited to the particular use contemplated. Alternative embodiments will become apparent to those skilled in the art to which the invention pertains without departing from its spirit and scope. Accordingly, the scope of the invention is defined by the appended claims rather than the foregoing description and the exemplary embodiments described therein.

What is claimed is:

1. A system for performing lidar self-calibration, comprising:
    a lidar sensor disposed on a vehicle and having a processor and a storage device storing computer executable instructions, wherein the computer executable instructions, when executed on the processor, cause the processor to:
obtain a lidar reference signal based on a plurality of reference objects corresponding to the vehicle;
determine a tilt angle of the lidar sensor based on the lidar reference signal;
isolate the tilt angle into a plurality of isolated angles, wherein the isolated angles include a pitch, a row and a yaw; and
for each corresponding isolated angle of the isolated angles,
determine, based on a corresponding calibration criteria, a corresponding offset between the lidar sensor and the vehicle for the corresponding isolated angle; and
perform a compensation to the corresponding isolated angle based on the corresponding offset;
wherein the reference objects include a first road, and the computer executable instructions, when executed on the processor, cause the processor to obtain the lidar reference signal by obtaining a plurality of slopes of the first road along a roll axis periodically, wherein the slopes are configured for calculation of the pitch of the tilt angle, and each corresponding slope of the slopes is obtained by:
obtaining a lidar frame from a point cloud generated by the lidar sensor;
extracting, from the lidar frame, information of the first road within a first range from the vehicle; and
calculating, based on the information of the first road, the corresponding slope of the first road along the roll axis;
wherein the slopes include three consecutive slopes of the first road along the roll axis, the corresponding calibration criteria for the pitch is a value of each of the three consecutive slopes, and the computer executable instructions, when executed on the processor, cause the processor to determine the corresponding offset for the pitch by:
determining whether each of the three consecutive slopes are equal;
in response to determining each of the three consecutive slopes are not equal, determining the first road to be not level and the pitch of the tilt angle is not calculable based on the three consecutive slopes; and
in response to determining each of the three consecutive slopes are equal, determining the first road to be level and the corresponding offset for the pitch to be the value of each of the slopes.

2. The system of claim 1, wherein the computer executable instructions, when executed on the processor, further cause the processor to, for each corresponding isolated angle,
obtain a plurality of consecutive corresponding offsets between the lidar sensor and the vehicle for the corresponding isolated angle; and
determine whether a corresponding compensated result is valid based on values of the consecutive corresponding offsets, wherein the compensation to the corresponding isolated angle is performed only in response to determining the corresponding compensated result to be valid.

3. The system of claim 1, wherein the first range is between 3 m and 20 m.

4. The system of claim 1, wherein the reference objects further include a second road and a straight structure, and the computer executable instructions, when executed on the processor, cause the processor to obtain the lidar reference signal by obtaining a slope of the second road along a pitch axis, wherein the slope of the second road is configured for calculation of the roll of the tilt angle, and the slope of the second road is obtained by:
obtaining a lidar frame from a point cloud generated by the lidar sensor;
extracting, from the lidar frame, information of the second road and the straight structure within a second range from the vehicle; and
calculating, based on the information of the second road and the straight structure, the slope of the second road along the pitch axis.

5. The system of claim 4, wherein the straight structure is a building wall or a street light pillar along the second road, and the second range is about 5 m.

6. The system of claim 4, wherein:
the corresponding calibration criteria for the roll is a value of the slope of the second road;
the roll of the tilt angle does not exist when the value of the slope of the second road is zero; and
the roll of the tilt angle exists when the value of the slope of the second road is not zero, and the corresponding offset between the lidar sensor and the vehicle for the roll is the value of the slope of the second road.

7. The system of claim 1, wherein the reference objects further include a parallel structure along a third road, and the computer executable instructions, when executed on the processor, cause the processor to obtain the lidar reference signal by obtaining a plurality of deviations between the parallel structure and a roll axis and a plurality of distances between the parallel structure and a pitch axis periodically, wherein the deviations and the distances are configured for calculation of the yaw of the tilt angle, and each of the deviations and the distances is obtained by:
obtaining a lidar frame from a point cloud generated by the lidar sensor;
extracting, from the lidar frame, information of the third road and the parallel structure within a third range from the vehicle; and
calculating, based on the information of the third road and the straight structure, a corresponding deviation between the parallel structure and the roll axis and a corresponding distance between the parallel structure and the pitch axis.

8. The system of claim 7, wherein the parallel structure is a road line of the third road, a curb along the third road, or a road fence along the third road, and the third range is between 3 m and 20 m.

9. The system of claim 7, wherein the deviations include two consecutive deviations, the distances include two consecutive distances, the corresponding calibration criteria for the yaw is a value of each of the two consecutive deviations and a value of each of the two consecutive distances, and the computer executable instructions, when executed on the processor, cause the processor to determine the corresponding offset for the yaw by:
determining whether each of the two consecutive deviations are equal;
in response to determining each of the two consecutive deviations are not equal, determining the yaw of the tilt angle is not calculable based on the two consecutive deviations;
in response to determining each of the two consecutive deviations are equal, determining whether a value of each of the two consecutive deviations is zero and whether each of the two consecutive distances are equal;

in response to determining value of each of the two consecutive deviations to be zero and each of the two consecutive deviations to be equal, determining the corresponding offset for the yaw to be zero;

in response to determining the value of each of the two consecutive deviations to be zero and each of the two consecutive deviations are not equal, determining the vehicle is not moving along the roll axis, and the yaw of the tilt angle is not calculable based on the two consecutive deviations and the two consecutive distances; and in response to determining the value of each of the two consecutive deviations to be not zero and each of the two consecutive deviations are not equal, determining the corresponding offset for the yaw to be the value of each of the two consecutive deviations.

10. A method for performing lidar self-calibration to a lidar sensor disposed on a vehicle, comprising:
   obtaining, by the lidar sensor, a lidar reference signal based on a plurality of reference objects corresponding to the vehicle;
   determining a tilt angle of the lidar sensor based on the lidar reference signal;
   isolating the tilt angle into a plurality of isolated angles, wherein the isolated angles include a pitch, a row and a yaw; and
   for each corresponding isolated angle of the isolated angles,
      determining, based a corresponding calibration criteria, a corresponding offset between the lidar sensor and the vehicle for the corresponding isolated angle; and
      performing a compensation to the corresponding isolated angle based on the corresponding offset;
   wherein the reference objects include a first road, and the lidar reference signal is obtained by obtaining a plurality of slopes of the first road along a roll axis periodically, wherein the slopes are configured for calculation of the pitch of the tilt angle, and each corresponding slope of the slopes is obtained by:
      obtaining a lidar frame from a point cloud generated by the lidar sensor;
      extracting, from the lidar frame, information of the first road within a first range from the vehicle; and
      calculating, based on the information of the first road, the corresponding slope of the first road along the roll axis;
   wherein the slopes include three consecutive slopes of the first road along the roll axis, the corresponding calibration criteria for the pitch is a value of each of the three consecutive slopes, and the corresponding offset for the pitch is determined by:
      determining whether each of the three consecutive slopes are equal;
      in response to determining each of the three consecutive slopes are not equal, determining the first road to be not level and the pitch of the tilt angle is not calculable based on the three consecutive slopes; and
      in response to determining each of the three consecutive slopes are equal, determining the first road to be level and the corresponding offset for the pitch to be the value of each of the slopes.

11. The method of claim 10, further comprising, for each corresponding isolated angle,
   obtaining a plurality of consecutive corresponding offsets between the lidar sensor and the vehicle for the corresponding isolated angle; and
   determining whether a corresponding compensated result is valid based on values of the consecutive corresponding offsets, wherein the compensation to the corresponding isolated angle is performed only in response to determining the corresponding compensated result to be valid.

12. The method of claim 10, wherein the reference objects further include a second road and a straight structure, and the lidar reference signal is obtained by obtaining a slope of the second road along a pitch axis, wherein the slope of the second road is configured for calculation of the roll of the tilt angle, and the slope of the second road is obtained by:
   obtaining a lidar frame from a point cloud generated by the lidar sensor;
   extracting, from the lidar frame, information of the second road and the straight structure within a second range from the vehicle, wherein the second range is about 5 m; and
   calculating, based on the information of the second road and the straight structure, the slope of the second road along the pitch axis.

13. The method of claim 12, wherein:
   the straight structure is a building wall or a street light pillar along the second road;
   the corresponding calibration criteria for the roll is a value of the slope of the second road;
   the roll of the tilt angle does not exist when the value of the slope of the second road is zero; and
   the roll of the tilt angle exists when the value of the slope of the second road is not zero, and the corresponding offset between the lidar sensor and the vehicle for the roll is the value of the slope of the second road.

14. The method of claim 10, wherein the reference objects further include a parallel structure along a third road, and the lidar reference signal is obtained by obtaining a plurality of deviations between the parallel structure and a roll axis and a plurality of distances between the parallel structure and a pitch axis periodically, wherein the deviations and the distances are configured for calculation of the yaw of the tilt angle, and each of the deviations and the distances is obtained by:
   obtaining a lidar frame from a point cloud generated by the lidar sensor;
   extracting, from the lidar frame, information of the third road and the parallel structure within a third range from the vehicle, wherein the third range is between 3 m and 20 m; and
   calculating, based on the information of the third road and the straight structure, a corresponding deviation between the parallel structure and the roll axis and a corresponding distance between the parallel structure and the pitch axis.

15. The method of claim 14, wherein the parallel structure is a road line of the third road, a curb along the third road, or a road fence along the third road, the deviations include two consecutive deviations, the distances include two consecutive distances, the corresponding calibration criteria for the yaw is a value of each of the two consecutive deviations and a value of each of the two consecutive distances, and the computer executable instructions, when executed on the processor, cause the processor to determine the corresponding offset for the yaw by:
   determining whether each of the two consecutive deviations are equal;

in response to determining each of the two consecutive deviations are not equal, determining the yaw of the tilt angle is not calculable based on the two consecutive deviations;

in response to determining each of the two consecutive deviations are equal, determining whether a value of each of the two consecutive deviations is zero and whether each of the two consecutive distances are equal;

in response to determining value of each of the two consecutive deviations to be zero and each of the two consecutive deviations to be equal, determining the corresponding offset for the yaw to be zero; and in response to determining the value of each of the two consecutive deviations to be not zero and each of the two consecutive deviations are not equal, determining the corresponding offset for the yaw to be the value of each of the two consecutive deviations.

16. The method of claim 10, wherein the first range is between 3 m and 20 m.

17. A system for performing lidar self-calibration, comprising:
a lidar sensor disposed on a vehicle and having a processor and a storage device storing computer executable instructions, wherein the computer executable instructions, when executed on the processor, cause the processor to:
obtain a lidar reference signal based on a plurality of reference objects corresponding to the vehicle, wherein the reference objects include a parallel structure along a road;
determine a tilt angle of the lidar sensor based on the lidar reference signal;
isolate the tilt angle into a plurality of isolated angles, wherein the isolated angles include a pitch, a row and a yaw; and
for each corresponding isolated angle of the isolated angles,
determine, based on a corresponding calibration criteria, a corresponding offset between the lidar sensor and the vehicle for the corresponding isolated angle; and
perform a compensation to the corresponding isolated angle based on the corresponding offset;
wherein the reference objects include a parallel structure along a road, and the computer executable instructions, when executed on the processor, cause the processor to obtain the lidar reference signal by obtaining a plurality of deviations between the parallel structure and a roll axis and a plurality of distances between the parallel structure and a pitch axis periodically, wherein the deviations and the distances are configured for calculation of the yaw of the tilt angle, and each of the deviations and the distances is obtained by:
obtaining a lidar frame from a point cloud generated by the lidar sensor;
extracting, from the lidar frame, information of the road and the parallel structure within a range from the vehicle; and
calculating, based on the information of the road and the straight structure, a corresponding deviation between the parallel structure and the roll axis and a corresponding distance between the parallel structure and the pitch axis;
wherein the deviations include two consecutive deviations, the distances include two consecutive distances, the corresponding calibration criteria for the yaw is a value of each of the two consecutive deviations and a value of each of the two consecutive distances, and the computer executable instructions, when executed on the processor, cause the processor to determine the corresponding offset for the yaw by:
determining whether each of the two consecutive deviations are equal;
in response to determining each of the two consecutive deviations are not equal, determining the yaw of the tilt angle is not calculable based on the two consecutive deviations;
in response to determining each of the two consecutive deviations are equal, determining whether a value of each of the two consecutive deviations is zero and whether each of the two consecutive distances are equal;
in response to determining value of each of the two consecutive deviations to be zero and each of the two consecutive deviations to be equal, determining the corresponding offset for the yaw to be zero;
in response to determining the value of each of the two consecutive deviations to be zero and each of the two consecutive deviations are not equal, determining the vehicle is not moving along the roll axis, and the yaw of the tilt angle is not calculable based on the two consecutive deviations and the two consecutive distances; and
in response to determining the value of each of the two consecutive deviations to be not zero and each of the two consecutive deviations are not equal, determining the corresponding offset for the yaw to be the value of each of the two consecutive deviations.

18. The system of claim 17, wherein the parallel structure is a road line, a curb along the road, or a road fence along the road, and the range is between 3 m and 20 m.

19. A method for performing lidar self-calibration to a lidar sensor disposed on a vehicle, comprising:
obtaining, by the lidar sensor, a lidar reference signal based on a plurality of reference objects corresponding to the vehicle;
determining a tilt angle of the lidar sensor based on the lidar reference signal;
isolating the tilt angle into a plurality of isolated angles, wherein the isolated angles include a pitch, a row and a yaw; and
for each corresponding isolated angle of the isolated angles,
determining, based a corresponding calibration criteria, a corresponding offset between the lidar sensor and the vehicle for the corresponding isolated angle; and
performing a compensation to the corresponding isolated angle based on the corresponding offset;
wherein the reference objects include a parallel structure along a road, and the lidar reference signal is obtained by obtaining a plurality of deviations between the parallel structure and a roll axis and a plurality of distances between the parallel structure and a pitch axis periodically, wherein the deviations and the distances are configured for calculation of the yaw of the tilt angle, and each of the deviations and the distances is obtained by:
obtaining a lidar frame from a point cloud generated by the lidar sensor;
extracting, from the lidar frame, information of the road and the parallel structure within a range from the vehicle; and calculating, based on the information of the road and the straight structure, a corresponding deviation between the parallel structure and the roll axis and a corresponding distance between the parallel structure and the pitch axis;

wherein the deviations include two consecutive deviations, the distances include two consecutive distances, the corresponding calibration criteria for the yaw is a value of each of the two consecutive deviations and a value of each of the two consecutive distances, and the computer executable instructions, when executed on the processor, cause the processor to determine the corresponding offset for the yaw by:

determining whether each of the two consecutive deviations are equal;

in response to determining each of the two consecutive deviations are not equal, determining the yaw of the tilt angle is not calculable based on the two consecutive deviations;

in response to determining each of the two consecutive deviations are equal, determining whether a value of each of the two consecutive deviations is zero and whether each of the two consecutive distances are equal;

in response to determining value of each of the two consecutive deviations to be zero and each of the two consecutive deviations to be equal, determining the corresponding offset for the yaw to be zero; and in response to determining the value of each of the two consecutive deviations to be not zero and each of the two consecutive deviations are not equal, determining the corresponding offset for the yaw to be the value of each of the two consecutive deviations.

20. The method of claim 19, wherein the parallel structure is a road line, a curb along the road, or a road fence along the road, and the range is between 3 m and 20 m.

* * * * *